US 7,707,559 B2

(12) United States Patent
Reddy

(10) Patent No.: US 7,707,559 B2
(45) Date of Patent: Apr. 27, 2010

(54) ANALYSIS OF ERRORS WITHIN COMPUTER CODE

(75) Inventor: Venkat A. Reddy, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 1087 days.

(21) Appl. No.: 11/214,560

(22) Filed: Aug. 30, 2005

(65) Prior Publication Data

US 2007/0050679 A1    Mar. 1, 2007

(51) Int. Cl.
G06F 9/44 (2006.01)
G06F 9/45 (2006.01)
G06F 5/00 (2006.01)

(52) U.S. Cl. ............... 717/131; 717/124; 717/126; 717/127; 717/154; 714/2; 714/37; 714/38; 714/45; 714/52

(58) Field of Classification Search ............... 717/38; 706/50, 59, 60, 61
See application file for complete search history.

(56) References Cited

U.S. PATENT DOCUMENTS

| | | | | |
|---|---|---|---|---|
| 5,974,568 | A * | 10/1999 | McQueen | 714/38 |
| 6,477,666 | B1 | 11/2002 | Sanchez et al. | |
| 6,484,276 | B1 * | 11/2002 | Singh et al. | 714/41 |
| 6,594,783 | B1 * | 7/2003 | Dollin et al. | 714/38 |
| 6,701,460 | B1 | 3/2004 | Suwandi et al. | |
| 7,096,459 | B2 * | 8/2006 | Keller et al. | 717/124 |
| 7,464,374 | B2 * | 12/2008 | Latten et al. | 717/125 |
| 7,516,025 | B1 * | 4/2009 | Williams et al. | 702/57 |
| 2003/0216903 | A1 | 11/2003 | Bowers et al. | |
| 2003/0237035 | A1 * | 12/2003 | Bowers et al. | 714/724 |
| 2004/0060044 | A1 | 3/2004 | Das et al. | |
| 2004/0249842 | A1 | 12/2004 | D'Alo et al. | |
| 2005/0114743 | A1 * | 5/2005 | Moorhouse | 714/100 |
| 2006/0184928 | A1 * | 8/2006 | Hughes | 717/168 |

OTHER PUBLICATIONS

IBM Dossiers, Nos. RSW9-2004-0042, FR9-2004-0093, AUS9-2004-0054, YOR9-2002-0096 (dated 2002-2004) (title and claims only).

* cited by examiner

*Primary Examiner*—Michael J Yigdall
*Assistant Examiner*—Hanh T Bui
(74) *Attorney, Agent, or Firm*—Schmeiser, Olsen & Watts; William H. Steinberg

(57) ABSTRACT

Where code execution results in an error attributable to multiple data elements, the code is revised so the error results from one element. Where execution improperly functions without error, and the elements contain required but missing properties, the code is improperly functioning in its required-property handling. Errors are organized into classes and error-causing elements are organized into independent sets corresponding to the classes. Elements that are not within any set are determined. Symptom, error, no-error, refined-symptom, and function databases can be employed during code execution analysis. Symptom database entries correspond to elements and indicate errors, or that no errors, are attributable to the elements. Error database entries correspond to elements resulting in errors upon execution. No-error database entries correspond to elements resulting in no errors upon execution. Refined-symptom database entries correspond to root cause elements of errors. Function database entries correspond to root cause elements of no errors.

18 Claims, 9 Drawing Sheets

FIG. 8A

| Configuration property | Error | Error message |
|---|---|---|
| userid | -30082 | User ID missing |
| url | -1013 | Database name or alias not found |
| url\|\|userid | -1013 | Database name or alias not found |
| tablename | -104 | Unexpected end of statement |
| tablename\|\|userid | -30082 | User ID missing |
| tablename\|\|url | -1013 | Database name or alias not found |
| tablename\|\|url\|\|userid | -1013 | Database name or alias not found |
| pwd | -30082 | Unsupported function |
| pwd\|\|userid | 0 | (no error) |
| pwd\|\|url | -1013 | Database name or alias not found |
| pwd\|\|url\|\|userid | -1013 | Database name or alias not found |
| pwd\|\|tablename | -30082 | Unsupported function |
| pwd\|\|tablename\|\|userid | -104 | Unexpected end of statement |
| pwd\|\|tablename\|\|url | -1013 | Database name or alias not found |
| pwd\|\|tablename\|\|url\|\|userid | -1013 | Database name or alias not found |

| Configuration property | Error | Error message |
|---|---|---|
| userid | -30082 | User ID missing | ← 802A
| url | -1013 | Database name or alias not found | ← 802B
| url\|\|userid | -1013 | Database name or alias not found | ← 802C
| tablename | -104 | Unexpected end of statement | ← 802D
| tablename\|\|userid | -30082 | User ID missing | ← 802E
| tablename\|\|url | -1013 | Database name or alias not found | ← 802F
| tablename\|\|url\|\|userid | -1013 | Database name or alias not found | ← 802G
| pwd | -30082 | Unsupported function | ← 802H
| pwd\|\|url | -1013 | Database name or alias not found | ← 802J
| pwd\|\|url\|\|userid | -1013 | Database name or alias not found | ← 802K
| pwd\|\|tablename | -30082 | Unsupported function | ← 802L
| pwd\|\|tablename\|\|userid | -104 | Unexpected end of statement | ← 802M
| pwd\|\|tablename\|\|url | -1013 | Database name or alias not found | ← 802N
| pwd\|\|tablename\|\|url\|\|userid | -1013 | Database name or alias not found | ← 802O

↑ 804A   ↑ 804B   ↑ 804C

810

ANALYSIS OF ERRORS WITHIN COMPUTER CODE

FIELD OF THE INVENTION

The present invention relates to the analysis of computer code, such as components of computer code, and more particularly to the analysis of errors resulting from execution of the computer code.

BACKGROUND OF THE INVENTION

Computer programs can be complex, large entities, and are made up of computer code. To ensure that the computer code has been developed properly, so that execution of the computer code properly functions and does not result in errors, significant analysis of the computer code may be performed while the computer code is being developed, and after the computer code has been developed. Such analysis can help ensure that the computer code has been coded properly, so that the computer code properly functions to expectations, and does not result in errors.

There are many different techniques that can be performed to ensure that execution of the computer code properly functions and does not result in errors. One technique that has been used is fault injection. In fault injection, purposeful errors, or faults, are injected into the computer code, such as via the data on or over which the computer code is to be executed. Subsequent execution of the computer code on this faulty data can then be used to isolate errors that result from the execution of the computer code, and to ensure that the computer code properly functions to expectations.

A problem with fault injection and other techniques in analyzing computer code is that it is sometimes difficult to isolate which data is causing which errors when the computer code is executed. When different elements of the data appear to be causing the same error, in other words, it can be difficult to determine which element is actually causing the error. As a result, revising the computer code so that it does not result in such errors when being executed can be time-consuming.

Furthermore, execution of computer code can sometimes result in no errors, even though the computer code is not properly functioning to expectations. That is, the computer code executes without error, but the end result of the execution of the computer code does not satisfy expectations. Even though execution of the computer code does not result in errors, it is said that the computer code is not properly functioning, since the end result of the execution does not satisfy expectations or specification. This type of problem is difficult to detect, and thus subsequently correct, using prior art analysis techniques.

For example, a customer may be provided a computing system running computer code to perform a given functionality. The computer code may be causing a given exception or other error, for which the root cause could not be determined, since the error may be generic and result from a number of different causes. Typically, what is done is to simulate the customer's environment, and run the computer code in a debugger environment step-by-step to try to locate and rectify the exact cause of the error. However, simulating a customer's environment can be difficult to accomplish perfectly, and furthermore, for errors that have multiple causes, it can be difficult to locate the and rectify the exact cause of an error.

For these and other reasons, there is a need for the present invention.

SUMMARY OF THE INVENTION

The present invention relates to analyzing computer code. A method of the invention executes the computer code over first data, such as configuration data, and second data, such as customer-supplied business data, or another type of data. The first data is at least substantially independent of the second data, in that the errors that may be triggered by the first data are at least typically not triggered by the second data. The first data is made up of a number of elements, such as configuration elements, each of which may represent a separate property (e.g., a configuration property), or a unique value for that property.

The method includes performing one of the following steps, acts, or actions. First, where execution of the computer code results in a given error due, or attributable, to more than one element of the first data, the computer code is revised so that the given error instead results from just one element of the first data. Second, where execution of the computer code improperly functions but no error results from execution of the computer code, and one or more elements of the first data each contain a property that is required for execution of the computer code, but is missing, it is determined that the computer code is improperly functioning in its handling of at least one of the properties that are required.

Third, where execution of the computer code results in a number of errors due, or attributable, to error-causing elements of the first data, the errors are organized into error classes and the error-causing elements are organized into independent sets of error-causing elements, such that each independent set of error-causing elements corresponds to an error class. Fourth, in one embodiment, where execution of the computer code results in errors due, or attributable, to the error-causing elements of the first data, redundant elements of the first data that are not members of any of the independent sets of error-causing elements are also determined. Each of these four steps, acts, or actions is a way to provide better analysis of computer code so that it properly functions upon execution.

An analysis system of the present invention includes a fault injection mechanism, a data collection mechanism, and a data analysis mechanism. The fault injection mechanism injects faults into configuration data for a target system, where the configuration data has a number of elements. The data collection mechanism collects monitoring data on the target system upon execution of the target system. Execution of the target system is based on the configuration data as well as customer-supplied data. The monitoring data includes errors resulting from execution of the target system, based on, or due to, the configuration data having the faults injected into it.

The data analysis mechanism analyzes the errors of the monitoring data collected by the data collection mechanism. The data analysis mechanism performs at least one of the following steps, acts, or actions in performing this analysis. First, the data analysis mechanism can recommend the computer code of the target system be revised, where execution of the computer code results in a given error due to more than one element of the configuration data, so that the given error results instead from just one element of the configuration data. Second, the data analysis mechanism can determine or conclude that the computer code is improperly functioning in its handling of one or more properties of one or more elements of the configuration data that are executed, where execution of the computer code improperly functions but results in no errors.

Third, the data analysis mechanism can organize the errors into error classes and organize error-causing elements of the configuration data into independent sets of error-causing elements, where execution of the computer code results in the errors due to the error-causing elements. Each independent set of error-causing elements corresponds to an error class.

Fourth, the data analysis mechanism can further determine or identify redundant elements of the configuration data that are not members of any of the independent sets of error-causing elements.

The analysis system may include a symptom database, an error database, a no-error database, a refined-symptom database, and/or a function database constructed by the data analysis mechanism. Each entry of the symptom database corresponds to an element of the configuration data and indicates or denotes an identity of an error attributable to the element, or that no error results due to the element. The error and no-error databases are constructed from the symptom database. Each entry of the error database corresponds to an element of the configuration data due to which execution of the computer code results in errors. Each entry of the no-error database corresponds to an element of the configuration data due to which execution of the computer code does not result in errors.

The refined-symptom database is constructed from the error database. Each entry of the refined-symptom database corresponds to an element of the configuration data that is a root cause of an error resulting from execution of the computer code. The function database is constructed from the no-error database. Each entry of the function database corresponds to an element of the configuration data that is a root cause of no error resulting from execution of the computer code. The symptom, error, no-error, refined-symptom, and function databases can allow the data analysis mechanism, or provide the data analysis mechanism with the ability, to perform its analysis-oriented steps, acts, or actions that have been described.

An article of manufacture of the invention includes a computer-readable medium and means in the medium. The computer-readable medium may be a recordable data storage medium, a modulated carrier signal, or another type of computer-readable medium. The means in the medium is for executing computer code over data having a number of elements, and for analyzing the results of execution of the computer code. The means may accomplish its analysis by performing one or more of the following steps, acts, or actions. First, where execution of the computer code results in a given error due to more than one element of the data, the means may recommend that the computer code be revised so that the given error instead results from just one element of the first data.

Second, where execution of the computer code improperly functions, no error results from execution of the computer code, and one or more elements of the data each contains a property that is required, but is missing, the means may determine or conclude that the computer code is improperly functioning in its handling of at least one of the properties that are required. Third, where execution of the computer code results in errors due to error-causing elements of the data, the means may enable a developer or other user to organize the errors into error classes and to organize the error-causing elements into independent sets of error-causing elements. Each independent set of error-causing elements corresponds to an error class. Fourth, where execution of the computer code results in the errors due to the error-causing elements of the data, the means may determined, or identify, redundant elements of the data that are not members of any of the independent sets of error-causing elements.

Embodiments of the invention can be employed after a giving computing system has been constructed, to assist in testing and debugging the system. As such, embodiments of the invention are typically useful for developers and testers of the computing system, as opposed to end users, for instance.

Embodiments of the invention provide for advantages over the prior art. Revising the computer code, or recommending that the computer code be revised, so that a given error results from just one element of configuration data, instead of from multiple elements of configuration data, helps isolate which part of the computer code is causing the error. Furthermore, in autonomic environments in which components of computer code are self-correcting, or self-fixing, errors generally have to be attributable to solitary elements of the configuration data in order for the computer code to heal, correct, or fix itself.

Determining that computer code is improperly functioning in its handling one or more properties that are required, but are missing, even when no error results from execution of the computer code, is advantageous to identify what is known as probable misbehavior of the computer code. For example, there are at least occasionally situations in which a property of an element of the configuration data is required, such that the computer code should generate an error if the property has not been specified. The computer code may improperly revert to a default value of the property, such that the computer code executes without causing errors. However, such reversion to a default value of the property is improper, and identification of such improper functioning is advantageous in ensuring that the computer code performs to specification or expectations.

Organizing the error-causing elements of the configuration data, which may be root cause elements of errors resulting from execution of computer code, into independent sets corresponding to errors classes of the errors is advantageous to identify what is known as probable correlation of the elements. For example, some elements of the configuration data may relate to database functionality of the computer code, whereas other elements of the configuration data may relate to web processing of the computer code. If the former elements are located within different error class-corresponding sets than the latter elements, then revising the computer code so that no errors occurs is more easily accomplished. This is because the invention allows it to become known that a given type of element causes one type of error, and that another type of element causes a different type of error. Furthermore, elements that do not cause any errors can be removed from the configuration data insofar as error analysis (and computer code revision to not result in any errors) is concerned, because they are redundant. It is also noted that organization the error-causing elements into independent sets corresponding to error classes, as accomplished by embodiments of the invention, is useful in fault-injection techniques. This is because identification of independent sets of error-causing elements reduces the number of permutations of configure elements that will ultimately need to be generated for such fault-injection techniques.

Still other aspects, advantages, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 8A, 8B, 8C, and 8D are tables depicting the example performance of the method of FIG. 3 in relation to a representative computing system, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview and System

Figure 1A:
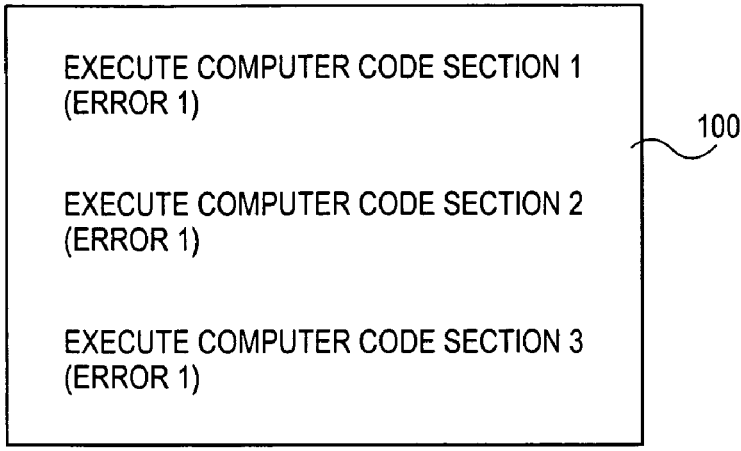
FIGS. 1A, 1B, and 1C are diagrams depicting errors, or no errors, resulting from the execution of computer code, which are solved by embodiments of the invention, or are according to embodiments of the invention, or in conjunction with which embodiments of the invention may be implemented.
Figure 1B:
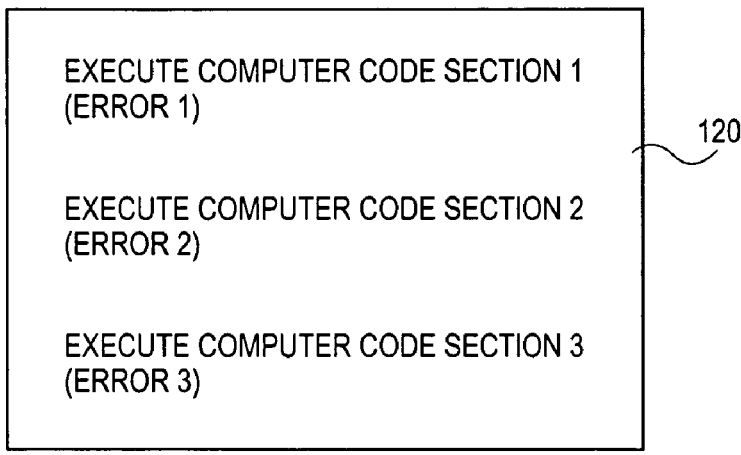
Figure 1C:
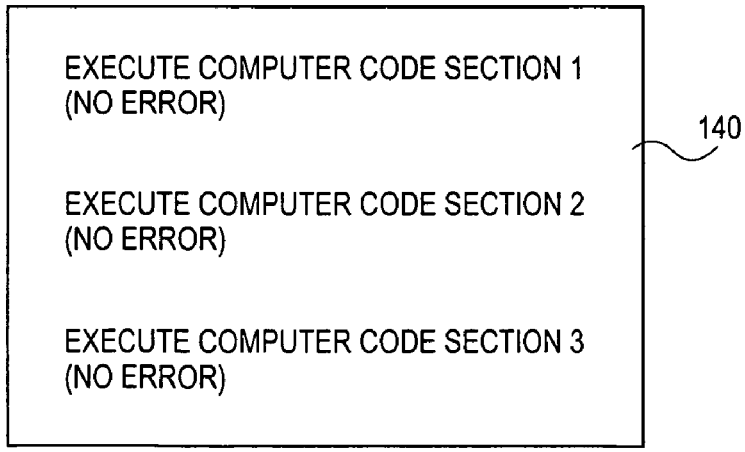

FIGS. 1A, 1B, and 1C illustrate errors, or no errors, resulting from the execution of computer code, which are solved by embodiments of the invention, or are according to embodiments of the invention, or in conjunction with which embodiments of the invention may be implemented. FIG. 1A specifically depicts computer code execution 100, according to the prior art, the problems of which are solved by embodiments of the invention. Three different sections of computer code, which may be different blocks of the same computer code component, are executed. Execution of each section of computer code results in the same error. Therefore, it is difficult to determine which configuration data, for instance, relied upon by which computer code section is the root cause of the error.

By comparison, FIG. 1B depicts computer code execution 120, according to an embodiment of the invention. Three different sections of computer code are again executed. However, execution of each section of computer code results in a different error, and not in the same error as in FIG. 1A. Embodiments of the invention allow for different configuration data, and thus potentially different sections of computer code relying upon different configuration data, to result in different errors resulting from the execution of the computer code sections. Therefore, embodiments of the invention provide for easier identification of which configuration data, for instance, relied upon by which computer code section is the root cause of each error.

Finally, FIG. 1C depicts computer code execution 140, in conjunction with which embodiments of the invention may be practiced. Three different sections of computer code are again execute, but without resulting in any errors. However, the computer code may not perform to expectations or specification. For example, a property such as a file name may be required for execution of the computer code, but this file name may not have been provided, such that the computer code is improperly reverting to a default file name. Therefore, embodiments of the invention allow the identification of situations in which the execution of computer code does not result in errors, but nevertheless is improper to some extent, and is not performing to expectations or specification.

Figure 2:
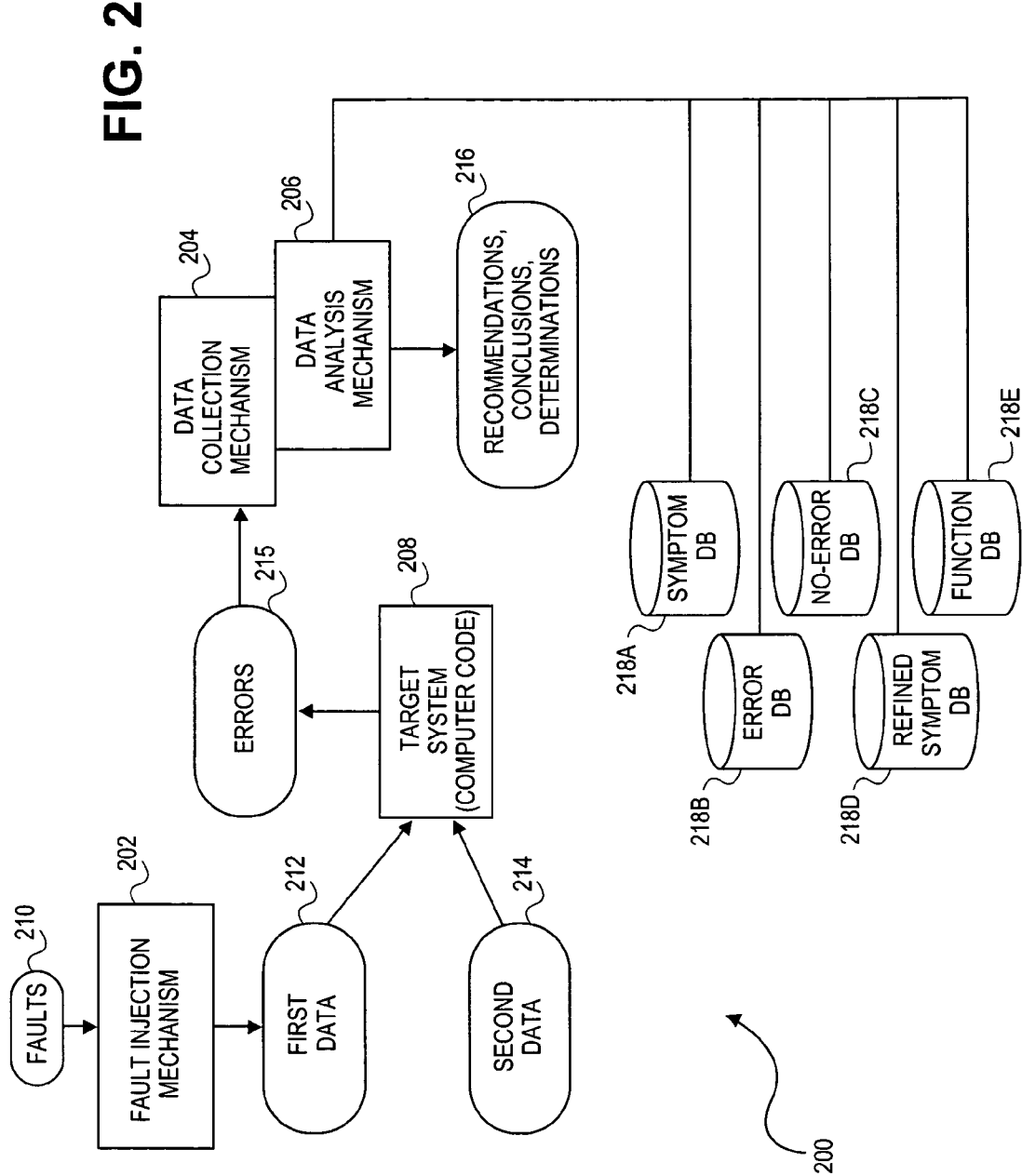
FIG. 2 is a diagram of an analysis system for analyzing the execution of computer code of a target system, according to an embodiment of the invention.

FIG. 2 shows an analysis system 200 for analyzing the computer code of a target system 208, according to an embodiment of the invention. The analysis system 200 includes a fault injection mechanism 202, a data collection mechanism 204, and a data analysis mechanism 206. Each of the mechanisms 202, 204, and 206 may be implemented in software, hardware, or a combination of software and hardware to implement its functionality, as will be described. As can be appreciated by those of ordinary skill within the art, the system 200 can and typically will include other components or mechanisms, in addition to the mechanism 202, 204, and 206.

The fault injection mechanism 202 injects faults 210 into first data 212. As such, the analysis system 200 can be said in one embodiment to be operating within a fault-injection environment. The computer code of the target system 208 is executed over the first data 212, with the faults 210 injected thereinto, and over second data 214. Execution of the computer code of the target system 208 results in errors 215, due to the injection of the faults 210 into the first data 212, and not, for instance, due to the second data 214.

The first data 212 may be configuration data, and the second data 214 may be customer-supplied, or business, data. The second data 214 may be other types of data as well, such as being supplied by a developer or a tester. Such configuration data can include the data that is needed to configure the target system 208 so that the computer code thereof can be executed. By comparison, such business data is the data, typically customer-supplied, that is the focus of the target system 208 to generate desired output or functionality. For example, within an accounting target system, the business data may be the financial transactions of a given company or other entity that are to be processed. Where the second data 214 is customer-supplied, the customer may be an internal or external customer.

The first data 212 and the second data 214 are at least substantially independent of each other, in that an error that results from a fault in the first data 212 will most likely not result from any fault in the second data 214, and vice-versa. Embodiments of the invention are generally concerned with faults injected into the first data 212. For given faults injected into the first data 212, the second data 214 is typically constant. For instance, the second data 214 may be populated with test cases that are designed in such a way as to ensure maximum utilization of the computer code of the target system 208.

The first data 212 may be defined as a collection of properties, or more generally, elements, and their values that a component of the computer code of the target system 208 reads to interact with the other components of the target system 208. For example, the first data 212 may be defined in either of the two following ways:

$$CFG = \{C_i | i \in N\} \quad (1)$$

$$CFG = (C_1, C_2, \ldots, C_n\} \quad (2)$$

In both formulations, the first data 212 is represented as a collection of elements and/or of the values of these elements, CFG. It is noted that the terminology $C_i$ is used herein to denote either an element or property generally, or a particular value for an element or property more specifically, in an interchangeable manner.

Several other terminologies may be defined in relation to the first data 212 and the second data 214. A data suite CFGS=P(CFG) is defined in relation to the first data 212, where P(CFG) is the power set of CFG—that is, all possible sets of the elements, regardless of whether the elements individually have specific values or are referred to generally. A data test case suite, BDTCS, is defined in relation to the second data 214, and is a collection of test cases of the second data 212 that run successfully on a particular component of the computer code of the target system 208 being tested. BDTCS is a subset of all possible instances of the second data 212. For purposes of description herein, it is assumed that a sufficient BDTCS of the second data 212 is provided for executing the target system 208 to result in the errors 215 due to the faults 210 injected into the first data 212.

Furthermore, an element CFGSE is an element of CFGS of the first data 212, and in relation to which the computer code of the target system 208 executes the BDTCS. That is, the computer code of a given component of the target system 208 is executed using CFGSE, running all the test cases of BDTCS, to determine any of the errors 215 that are due to CFGSE. Thus, for each element of CFGS, the computer code of the target system 208 is executed over BDTCS.

The faults 210 injected by the fault injection mechanism 210 into the first data 212 are particular values of particular elements of the first data 212, or are particular elements of the first data 212, regardless of their values. The errors 215 are the errors resulting from the first data 212 upon execution of the computer code of the target system 208 over the first data 212 and the second data 214. Each of the errors 215 may be attributed to one or more elements of the first data 212.

The data collection mechanism 204 collects monitoring data on the target system 208 upon execution of the target system 208. This monitoring data includes the errors 215. It is noted in one embodiment that the data collection mechanism 204 collects the first error that occurs, such that subsequent errors that result from this first error can be ignored. The monitoring data may further contain other information regarding the target system 208, such as, for instance, the processing output of the target system 208 based on the second data 214. The data collection mechanism 204 passes this monitoring data to the data analysis mechanism 206. The errors 215 include a set of unique errors, each of which may be identified by a unique identifier and/or a unique descriptive string, such as an error identifier (ID).

The data analysis mechanism 206 analyzes the errors 215 of the monitoring data collected by the data collection mechanism 204. The analysis provided by the data analysis mechanism 206 may include recommendations, conclusions, and determinations 216, all of which are presented to the user running the analysis system 200, such as on a display screen, or as printed hardcopy, and so on. The data analysis mechanism 206 thus makes determinations and conclusions regarding the computer code of the target system 208 vis-à-vis the errors 215, and outputs such determinations and conclusions. The data analysis mechanism 206 further may make recommendations regarding how the computer code of the target system 208 has been developed, in relation to the errors 215, and output such recommendations. The specific types of recommendations, conclusions, and determinations 216 made by the data analysis mechanism 206 are specifically described in the next section of the detailed description.

In general, however, the following is described to indicate the bases and/or presuppositions upon which the data analysis mechanism 206 makes its recommendations, conclusions, and determinations 216. It is noted that if CFGSE results in an error over the BDTCS, then CFGSE is the cause of the error, and the error occurs reproducibly over time. If CFGSE does not result in an error, then a "no error" is associated with CFGSE. A no error is a flag or other indicator that denotes that the computer code of the target system 208 performs properly as to that CFGSE.

Furthermore, if two CFGSE, CFGSE1 and CFGSE2 result in the same error, then CFGSE1 is said to be the root cause of the error as compared to CFGSE2 if CFGSE1 $\subseteq$ CFGSE2. In other words, such an error is attributed to CFGSE1 and not to CFGSE2. CFGSE2 is said to contain a redundancy in configuration with respect to the error in question.

CFGSE1 and CFGSE2 are said to be independent configurations, or elements, with respect to an error if both CFGSE1 and CFGSE2 generate the error over BDTCS and CFGSE1∩CFGSE2≠CFGSE1 OR CFGSE2. That is, CFGSE1 and CFGSE2 are independent of one another with respect to an error if both CFGSE1 and CFGSE2 generate the error over BDTCS and neither CFGSE1 $\subseteq$ CFGSE2 nor CFGSE2 $\subseteq$ CFGSE1. Thus, it is noted that if, for a given error, CFGSE1 and CFGSE2 are not independent configurations, or elements, then CFGSE1 is a root cause of the error as compared to CFGSE2 or vice-versa. That is, if CFGSE1 and CFGSE2 are not independent elements, or elements, then either CFGSE1 $\subseteq$ CFGSE2 or CFGSE2 $\subseteq$ CFGSE1.

In performing its analysis on the errors 215, the data analysis mechanism 206 can in one embodiment construct and use a symptom database 218A, an error database 218B, a no-error database 218C, a refined symptom database 218D, and a function database 218E, which are collectively referred to as the databases 218. The use of databases 218 is described in more detail in the next section of the detailed description. However, generally, entries of the symptom database 218A each correspond to an element of the first data 212, specifically a CFGSE, and indicate whether execution of the computer code of the target system 208 resulted in an error attributable to the element, or resulted in no error.

In the case where an element resulted in an error in the execution of the computer code of the target system 208, the corresponding entry of the symptom database 218A may further include identification of that error. There is thus at least one entry within the symptom database 218A for each element of the first data 212. Where just one error, or no error, is attributable to a given element—i.e., a CFGSE—then there is one corresponding entry within the symptom database 218A. (As has been described, it is noted that an element may be a property, or a value of a property.)

The error database 218B is constructed from the symptom database 218A. Entries of the error database 218B correspond to the elements of the first data 212 due to which execution of the computer code of the target system 208 resulted in errors. The no-error database 218C is also constructed from the symptom database 218A. Entries of the no-error database 218C correspond to the elements of the first data 212 due to which execution of the computer code of the target system 208 resulted in no errors. Thus, there is at most one entry within the no-error database 218C for any given element.

The refined-symptom database 218D is constructed from the error database 218B. Entries of the refined-symptom database 218D correspond to the elements of the first data 212 that are root causes of the error resulting from execution of the computer code of the target system 208, as the terminology root cause has been described. Furthermore, a given error may have more than one element that is a root cause for the given error, such that there is more than one entry referencing that error within the refined-symptom database 218D.

The function database 218E is constructed from the no-error database 218C. Entries of the function database 218E correspond to the elements of the first data 212 that are root causes of no errors occurring from execution of the computer code of the target system 208.

SPECIFIC EMBODIMENT AND METHOD

Figure 3:
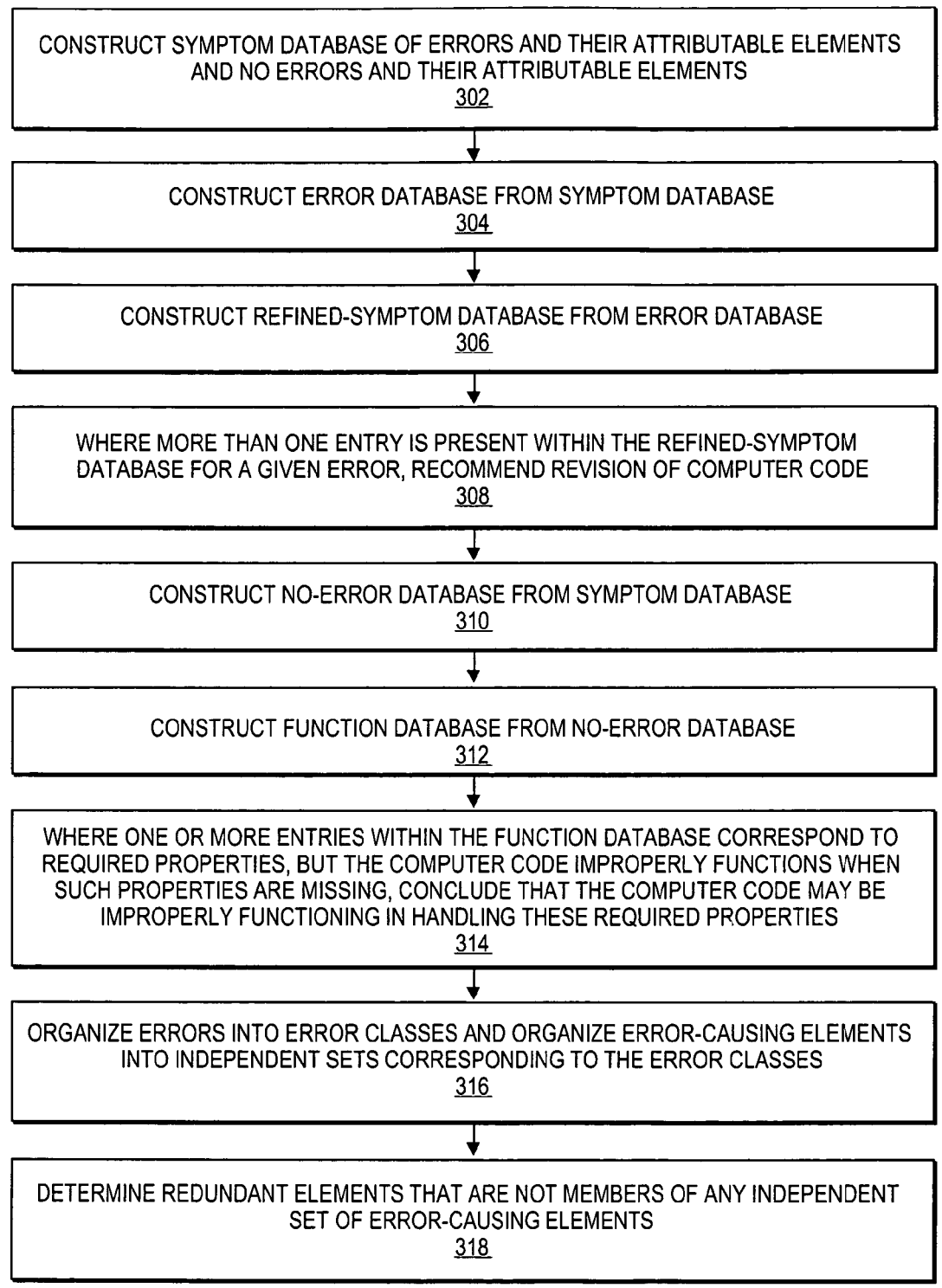
FIG. 3 is a flowchart of a method for analyzing the execution of computer code of a target system, according to an embodiment of the invention.

FIG. 3 shows a method 300 that can be performed by the data analysis mechanism 206 on the errors 215 resulting from execution of the computer code of the target system 208 of FIG. 2, according to an embodiment of the invention. First, the symptom database 218A is constructed based on the errors 215 and the elements of the first data 212 (302). For each element (i.e., each CFGSE) of the first data 212, if any of the errors 215 is attributable to that element, an entry is created within the symptom database 218A for the element corresponding to those of the errors 215 attributable to the element. If an element of the first data 212 did not cause any of the errors 215, then a single entry is created within the symptom database 218A for that element, indicating that the element resulted in no errors.

Next, the error database 218B is constructed from the symptom database 218A (304), as has been described in the previous section of the detailed description. The error database 218B is then used to construct the refined-symptom database 218D (306). The refined-symptom database 218D includes all the CFGSE's that are root causes for each unique error of the errors 215. For example, if CFGSE1 and CFGSE2 are both causes of a given error, but if CFGSE1 is a root cause and CFGSE2 is not, then only an entry is created within the refined-symptom database 218D for CFGSE1 as to this error.

As another example, if CFGSE1, CFGSE2, CFGSE3, and CFGSE4 are all causes of another error, but if CFGSE1 is the only root cause of this error, such that $CFGSE1 \subseteq CFGSEn | n=2, 3, 4$, then only an entry is created within the refined-symptom database 218D for CFGSE1 as to this error. Furthermore, there may be more than one entry within the refined-symptom database 218D for a given error if more than one element is a root cause of that error. For instance, if CFGSE1 and CFGSE2 are both causes of a given error, but neither CFGSE1 nor CFGSE2 is a root cause of the error as compared to the other element, such that neither $CFGSE1 \subseteq CFGSE2$ nor $CFGSE2 \subseteq CFGSE1$ is true, then both CFGSE1 and CFGSE2 are root causes of the error.

Therefore, if for a given error in the error database 218B, $CFGSEi \subseteq CFGSEj$ where $i \neq j$, then CFGSEj will not have a corresponding entry within the refined-symptom database 218D. Furthermore, the refined-symptom database 218D cannot contain entries corresponding to elements of the first data 212 that are not independent for a given error. For instance, if CFGSE1 and CFGSE2 both result in the same error, and are not independent, then by definition either CFGSE1 is a root cause compared to CFGSE2, or vice-versa. That is, either $CFGSE1 \subseteq CFGSE2$ or $CFGSE2 \subseteq CFGSE1$ is true. Therefore, either CFGSE1 or CFGSE2 is not present within the refined-symptom database 218D.

Figure 4:
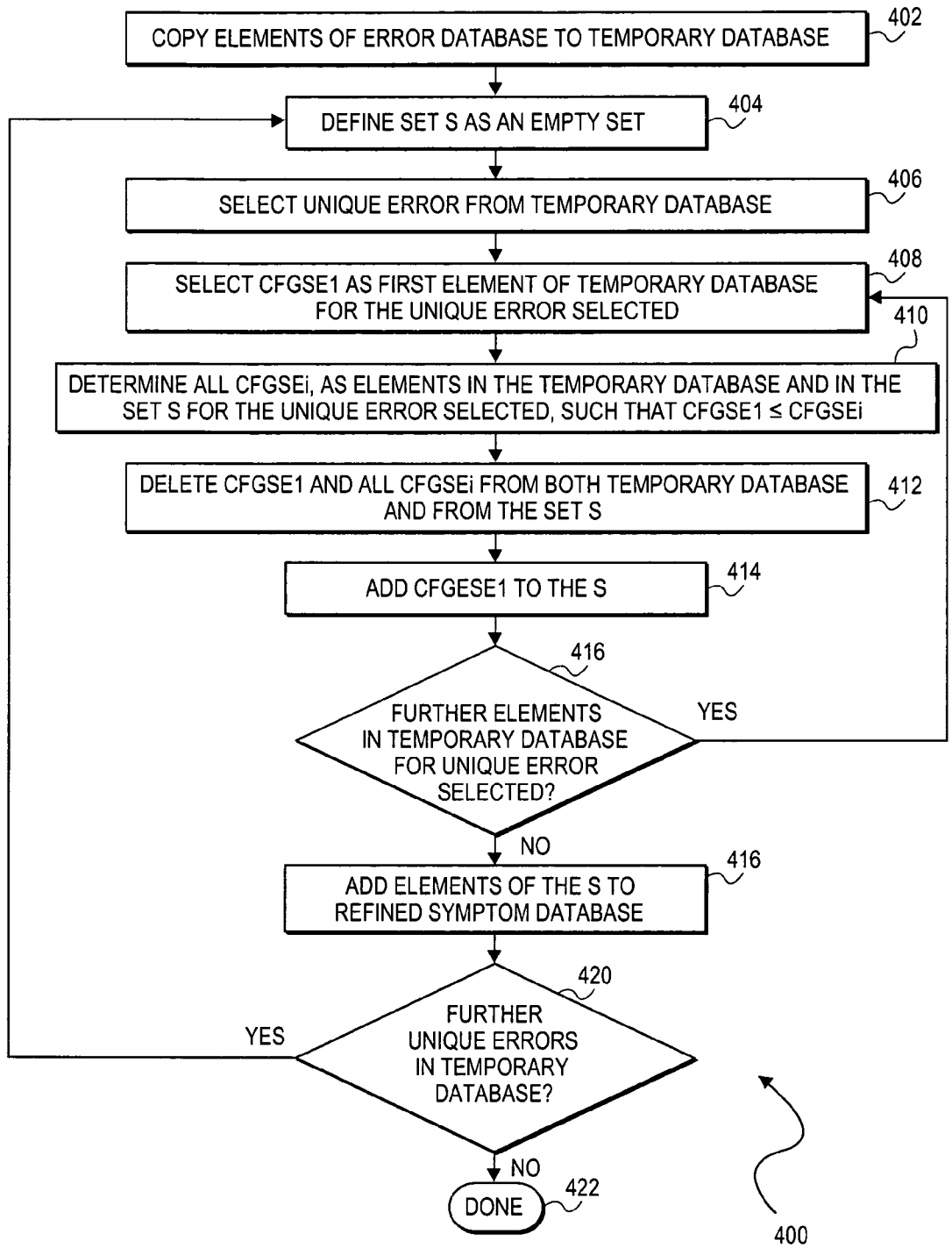
FIGS. 4, 5, 6, and 7 are flowcharts of methods for implementing different parts of the method of FIG. 3, according to varying embodiments of the invention.

FIG. 4 shows a method 400 that can be used to construct the refined-symptom database 218D in one particular embodiment of the invention. All of the elements of the error database 218B are copied to a temporary database (402). A set S is defined as an empty set, Ø (404). A unique error is selected from the temporary database (406), and CFGSE1 is selected as the first element of the temporary database for the unique error selected (408). All CFGSEi for the unique error selected, as elements for this error in the temporary database or the set S, are determined, such that $CFGSE1 \subseteq$ all CFGSEi (410). CFGSE1 and all CFGSEi are deleted from both the temporary database and from the set S (412), and CFGSE1 is added to the set S (414).

If there are further elements within the temporary database for the unique error that has been selected (416), then the method 400 is repeated at 408, where CFGSE1 in the next performance of 408 is a different element than the original CFGSE1, insofar as the original CFGSE1 has been removed from the temporary database in 412. However, if there are no further elements within the temporary database for the unique error selected (416), then the elements of the set S are added to the refined-symptom database 218D (418). If there are any other unique errors in the temporary database (420), then the method 400 is repeated at 404 for another unique error. Otherwise, if there are no further unique errors in the temporary database (420), then the method 400 is finished (422).

Referring back to the method 300 of FIG. 3, if there is more than one entry within the refined-symptom database 218D for any given error, then the method 300 recommends that the computer code of the target system 208 be revised (308). More than one entry within the refined-symptom database 218D for a given error means that there is more than one root-cause element of the error. That is, there is more than one element of the first data 212 that is a root cause of the error when the computer code of the target system 208 is executed. The recommendation is that the computer code be modified so that at most only one element of the first data 212 is a root cause of the error in question. In one embodiment, where the method 300 is not necessarily performed by the data analysis mechanism 206, 308 includes revision or correction of the computer code itself.

For example, both CFGSE1 and CFGSE2 may be root causes of a given error. The computer code of the target system 208 is thus modifiable, for instance, so that just CFGSE1 results in this error, and CFGSE2 results in a differently identified error. The advantage provided is that if a given error occurs, it can be attributed to a single element CFGSE1 or CFGSE2. That is, the source of the error can be more easily, and precisely, pinpointed or identified. Furthermore, in autonomic systems in which components of computer code are self-healing, or self-correcting, being able to identify the exact root cause of an error can be important, so that potentially a component is able to perform the only possible avenue of correction itself. By comparison, if there is more than one root cause of an error, the component may have to instead select from a number of different correction options, or request that a user identify which option should be selected.

As a more concrete example, CFGSE1 may correspond to a user identifier, and CFGSE2 may correspond to the password for the user identifier. The computer code of the target system 208 may involve user authentication based on the user identifier and the password. Where the user identifier is missing, the computer code may result in a given error attributable to CFGSE1, whereas if the password is missing, the computer code may result in the same error, but attributable to CFGSE2. In this instance, either the user identifier or the password being missing results in this error, such that CFGSE1 is not a root cause vis-à-vis CFGSE2, and vice-versa. Therefore, a recommendation may be made so that one particular error is triggered when the user identifier is missing, attributable to CFGSE1, and another, different particular error is triggered when the password is missing, attributable to CFGSE2.

Next, the no-error database 218C is constructed from the symptom database 218A (310), as has been described in the previous section of the detailed description. The no-error database 218C is then used to construct the function database 218E (312). The function database 218E includes all the CFGSE's that are root causes of no errors resulting from execution of the computer code of the target system 208, such that in effect redundancies are removed from the no-error database 218C.

For example, if CFGSE1 and CFGSE2 are both causes of no errors so occurring, but if CFGSE1 is a root cause and CFGSE2 is not, then only an entry is created within the function database 218E for CFGSE1. As another example, if CFGSE1, CFGSE2, CFGSE3, and CFGSE4 are all causes of no errors occurring when the computer code of the target system 208 is executed, but if CFGSE1 is the only root cause for no error so occurring, such that CFGSE1 $\subseteq$ CFGSEn|n=2, 3, 4, then only an entry is created within the function database 218E for CFGSE1. There may be more than one entry within the function database 218E if more than one element is a root cause of no errors occurring when the computer code of the target system 208 is executed.

Figure 5:
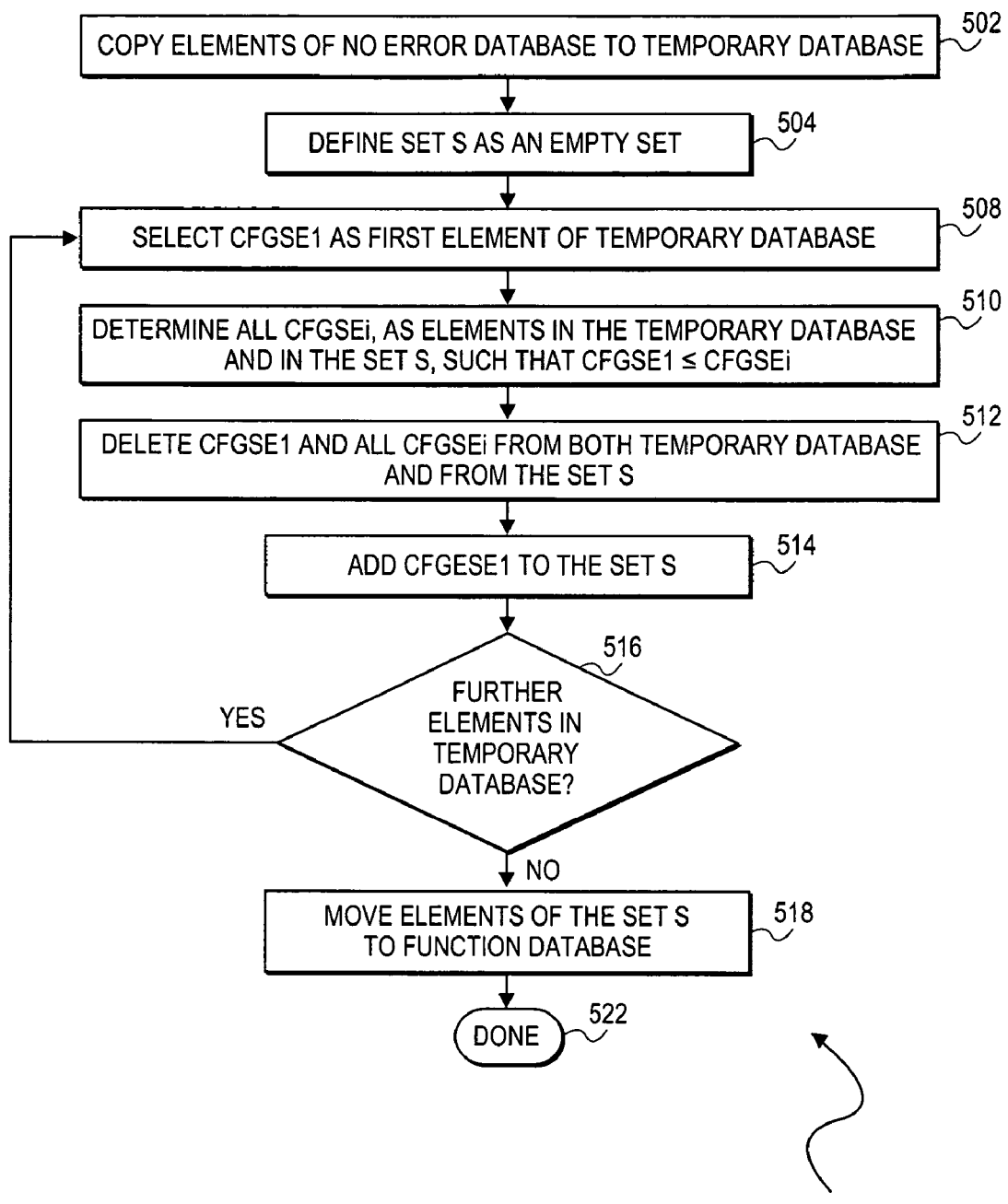

FIG. 5 shows a method 500 that can be used to construct the function database 218E in one particular embodiment of the invention. All of the elements of the no-error database 218C are copied to a temporary database (502). A set S is defined as an empty set, $\emptyset$ (504). CFGSE1 is selected as the first element of the temporary database (508). All CFGSEi, as elements in the temporary database or the set S, are determined, such that CFGSE1 $\subseteq$ all CFGSEi (510). CFGSE1 and all CFGSEi are deleted from both the temporary database and from the set S (512), and CFGSE1 is added to the set S (514).

If there are further elements within the temporary database (516), then the method 500 is repeated at 508, where CFGSE1 in the next performance of 508 is a different element than the original CFGSE1, insofar as the original CFGSE1 has been removed from the temporary database in 512. However, if there are no further elements within the temporary database for the unique error selected (516), then the elements of the set S are moved to the function database 218E (518), to create the function database 218E, and the method 500 is finished (522).

Referring back to the method 300 of FIG. 3, if there are entries within the function database 218E that correspond to required properties, and the computer code is nevertheless not functioning properly—e.g., when faults are injected into the elements of these entries, such that the properties are missing—then the method 300 concludes, or determines, that the computer code may be malfunctioning in its handling of the these required properties (314). The method 300 may thus recommend that the computer code be examined or revised in this regard. In one embodiment, where the method 300 is not necessarily performed by the data analysis mechanism 206, 314 may include so revising or correcting the computer code of the target system 208 itself.

314 is now more particularly described. If a CFGSE$\in$CFGS of the function database 218E, then this means that CFGSE did not result in any errors upon execution of the computer code of the target system 208. However, if the computer code nevertheless is not functioning properly, such as in particular when a fault has been injected into CFGSE, then such malfunctioning can be due to the way in which the computer code handles CFGSE, especially in the case where CFGSE relates to a required property that is missing. Therefore, 314 involves making such a determination or conclusion, recommending that the computer code be examined in this regard, or correcting or revising the computer code in this respect.

CFGSE relates to a required property where it is an element that is, corresponds to, includes, or relates to a property that is required for proper execution of the computer code of the target system 208. Where such a property is not present, such as by a fault being so injected into CFGSE, then an error should be caused by CFGSE. However, if CFGSE is present in the function database 218E, then this means that CFGSE did not result in any such errors—but should have—such that it can be concluded that the computer code is not properly functioning. A property is required in one embodiment if a value is required, such as by being supplied by an end user, where a default value cannot be substituted for the required value, in order for the computer code of the target system 208 to execute properly.

For example, the computer code of the target system 208 may be required to read a property that denotes the path of a folder within a file system, in order to delete the files stored in that folder. This property may be required, in that a user is required to specify the path of the folder before the files in that folder are deleted. However, this property may not be specified by the user, as can be artificially caused by injecting a fault into the element including, containing, relating to, or corresponding to this property. Therefore, if this element is present in the function database 218E, the computer code is not functioning properly. That is, the computer code may be presuming a default folder path, and deleting the files stored in this folder, when in actuality the computer code should result in an error attributable to the element in question where the property is required but not present.

As another example, the computer code of the target system 208 may be required to have properties corresponding to a user identifier and the password for that user identifier in order to perform user authentication. If either or both of the elements including, containing, corresponding to, or relating to these required properties are present in the function database 218E, then the computer code is not functioning properly where the corresponding property or properties are absent. That is, if the user identifier or the password is not specified, then execution of the computer code of the target system 208 should result in errors attributable to the elements of the missing property or properties. Thus, the computer code may be improperly presuming a default user identifier or password.

Next, the errors 215 are organized into error classes, which is accomplished by the developer, tester, or other user, and the elements causing these errors are organized into independent sets of error-causing elements corresponding to the error classes (316). The organization of the error-causing elements into independent sets may particularly be displayed to the user, where such organization is performed by the data analysis mechanism 206, for instance. The errors 215 may be organized into error classes by the user, such as by the developer or the tester of the computer code of the target system 208. As one rudimentary example, some of the errors 215 may result from improper interaction with a database, such that all of these errors are considered database-related errors and are organized in a first class. The other of the errors 215 may result from improper interaction with a web server, such that all of these other errors are considered web-related errors and are organized in a second class.

In one embodiment, the elements that cause the errors that have been organized into error classes are particularly the root-cause errors identified within the refined-symptom database 218D. As such, these elements are organized into independent sets of root-cause error-causing elements corresponding to the error classes that have been organized. A given such set CP for a given error is the set $\cup$CFGSEi, where each CFGSEi$\in$CFGS, and each CFGSEi has a corresponding entry within the refined-symptom database 218D as to the given error.

Continuing the rudimentary example described above, the root-cause errors of the refined-symptom database 218D are organized into two independent sets of error-causing elements: a first set corresponding to database-related errors, and a second set corresponding to web-related errors. In one embodiment, the elements of the first data 212 that are within the refined-symptom database 218D are thus effectively segmented into two sets of configuration properties. One configuration set relates to the class of database-related errors, and another configuration set relates to the class of web-related errors.

Organizing elements that relate to configuration properties into different independent configuration sets is advantageous, as it can give the developer a sense of which configuration properties are related to one another, and which configuration properties are independent, and thus not-related, to one another. Such organization may provide the developer of the computer code of the target system 208 with a better understanding of the configuration properties than before. The developer, in other words, identifies particular error classes, and the method 300 in 316 returns the elements, and thus in one embodiment the independent sets of configuration properties, that correspond to these classes of errors.

The sets are independent of one another because the error classes to which the sets correspond are independent of one another. For instance, web-related errors may be unrelated to database-related errors, such that it can be said that the set of elements causing the web-related errors is independent of the set of elements causing the database-related errors. That is, that a web-related error is caused by any element within the set corresponding to web-related errors is independent of any database-related error.

Figure 6:
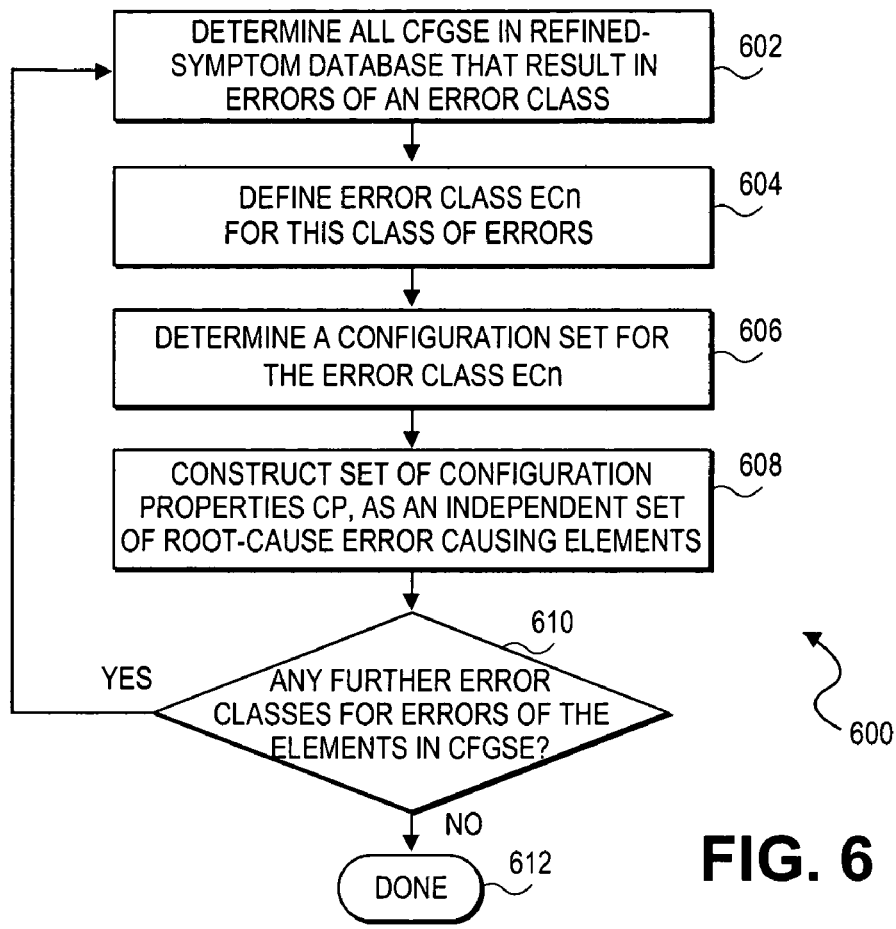

FIG. 6 shows a method 600 that can be used to construct the independent sets of root-cause error-causing elements in one particular embodiment of the invention. First, all the CFGSE within the refined-symptom database 218D that result in the errors of a given error class are determined (602). This error class ECn is defined as the set of all the errors of a given type or class, which each such error is a valid error for a component of the computing system in question (604). The configuration set for the error class ECn is determined as the set of all CFGSEi, where each CFGSEi is a member of the refined-symptom database 218D, and the error for the CFGSEi belongs to the error class ECn (606).

A set of configuration properties CP is defined as an independent set of root-causing error-causing elements from the configuration set for the error class ECn (608). Specifically, CP=∪CFGSEi, where CFGSEi∈ECI. If there are any further error classes for errors of the elements in CFGSE (610), then the method 600 repeats at 602 with another class of errors encompassing at least one of the errors of the elements in CFGSE. When there are no further error classes for errors of the elements in CFGSE (610), then the method 600 is finished (612).

Finally, referring back to FIG. 3, the method 300 can determine, or identify, those elements of the first data 212 that are not members of any of the independent sets of error-causing elements, as redundant elements (318). Elements of the first data 212 that are not members of any of the independent sets of error-causing elements are not root causes of any of the errors 215. The redundant elements may be identified by the set R=CFG−S, where S is the union of all the independent sets of error-causing elements. Identifying such elements is useful, because in effect these redundant elements do not affect the behavior of the computer code of the target system 208, in that they do not cause errors upon execution of the computer code, even when faults are injected into these elements. As such, they may be recommended for removal from the first data 212, or actually removed from the first data 212, in 316.

Redundant elements may occur when functionality of the computer code of the computer code of the target system 208 has changed, but when configuration properties to which the elements of the first data 212 have not been correspondingly updated. For example, the computer code may originally delete three files, where the file name of each file is specified by a configuration property to which an element corresponds. The computer code may then be updated to delete two files, but there may still be three elements specifying file names of files.

If a fault is thus injected into the element corresponding to the file name of the third file, which is no longer deleted by the computer code, an error will not result, since the computer code is no longer attempting to delete this file name. For example, injection a fault into the element corresponding to the file name of the third file may include inserting illegal characters, such as the symbols "\", "?", and "*" into the file name. If the computer code had tried to delete such a named file, then an error would result. However, since no error resulted, the element specifying this file name is redundant, and can be removed from the first data 212.

Figure 7:
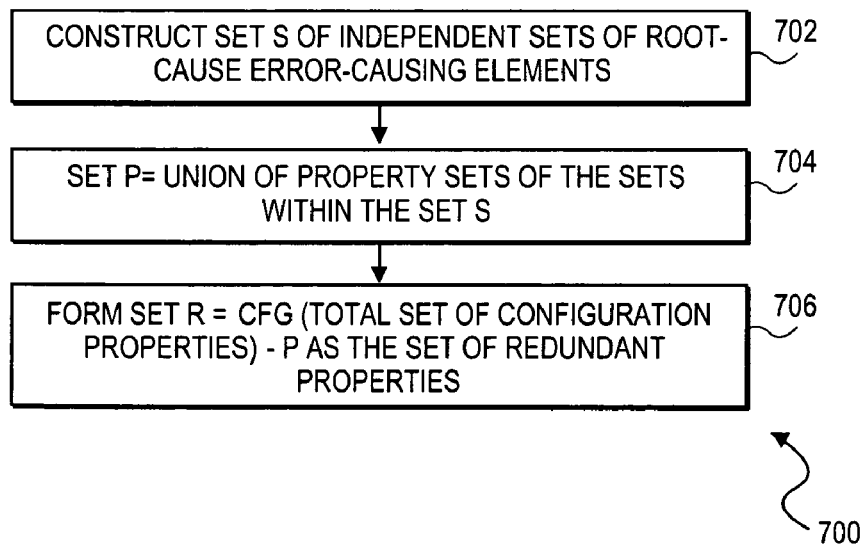

FIG. 7 shows a method 700 for determining the redundant elements in one particular embodiment of the invention. The set S is constructed as the set of all the independent sets of root-cause error-causing elements that have already been constructed (702). A set P is then determined as the union of the property sets of all the sets within the set S (704). More specifically, P=∪Si, for each Si∈S. Finally, the set of redundant properties R is determined as the set of all configuration properties CFG, which is the total set of configuration properties,—the set P that has been determined (706).

The method 300 of FIG. 3 that has been described thus performs four types of analysis, identified by 308, 314, 316, and 318 in FIG. 3. The data analysis mechanism 206 may perform one or more of these different types of analysis. Performing the analysis can include simply making a particular determination or a particular conclusion, as well as alerting the user or developer to the particular determination or conclusion. Furthermore, analysis performance can include making recommendations to the user or developer as to a particular issue. Finally, analysis performance can encompass performing the recommendation, too, such as by revising the computer code of the target system 208.

EXAMPLE

Figure 8C:
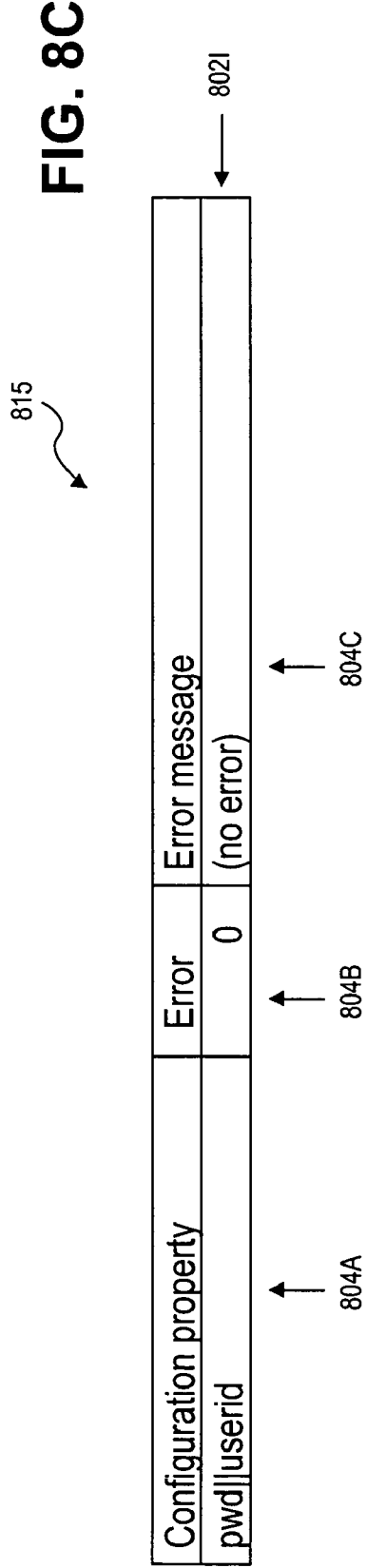
Figure 8D:
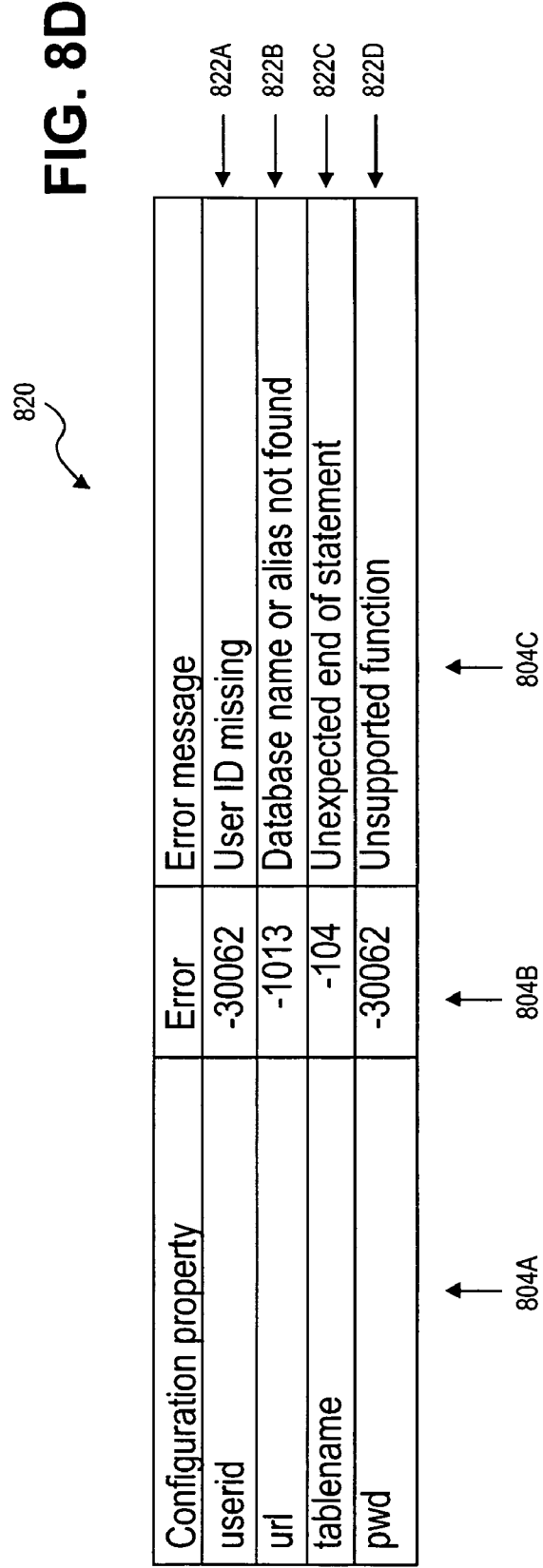

FIGS. 8A, 8B, 8C, and 8D are tables depicting an example performance of the method 300 of FIG. 3 that has been described, in relation to a representative computing system, according to an embodiment of the invention. FIG. 8A shows a table 810 corresponding to the symptom database 218A for this computing system, and FIG. 8B shows a table 810 corresponding to the error database 218B for this computing system. Furthermore, FIG. 8C shows a table 815 corresponding to the no-error database 218C and the function database 218E for this computing system, and FIG. 8D shows a table 820 corresponding to the refined symptom database 218D for this computing system.

In FIG. 8A, the table 800 includes a number of table entries 802A, 802B, . . . , 802O, collectively referred to as the entries 802. These entries are the records of the symptom database 218A. Each of the entries 802 has three values, corresponding to the columns 804A, 804B, and 804C, which are collectively referred to as the columns 804. These values are: a configuration property, an error identifier, and an error message. A unique configuration property may be the joining of two configuration properties. For instance, there are individual configuration properties "userid" (i.e., user identifier or user ID) and "pwd" (i.e., password), as well as the individual configuration property "pwd||userid," which corresponds to the joining of the properties "pwd" and "userid." It is noted that the entry 802I in particular corresponds to no error having been generated, such that there is an error of zero.

In FIG. 8B, the table 810 includes all the table entries 802 of FIG. 8A, except for the entry 802I. This is because the table 810 corresponds to the error database 218B (and the function database 218E, as will be described), and the entry 802I does not correspond to an error having occurred. By comparison, in FIG. 8C, the table 815 includes the single table entry 802I of FIG. 8A, because the table 815 corresponds to the no-error database 218C (and to the function database 218E, as will be described).

In FIG. 8D, the table 820 includes the table entries 822A, 822B, 822C, and 822D, collectively referred to as the entries 822, having values in each of the columns 804 that have been described. The table 822 corresponds to the refined-symptom database 218D. As such, the entries 822 represent root causes of errors, as compared to all causes of the errors of the entries of the table 810 of FIG. 8B that corresponds to the error database 218B. For example, the entry 822A represents the root cause of the error of which the entries 802A and 802E of FIG. 8B represent causes, whereas the entry 822B represents the root causes of the error of which the entries 802B, 802C, 802F, 802G, 802J, 802K, 802N, and 802O of FIG. 8B represent causes. Likewise, the entry 822C represents the root cause of the error of which the entries 802D and 802M of FIG. 8B represent causes, and the entry 822D represents the root cause of which the entries 802H and 802L of FIG. 8B represent root causes.

From the table 820 of FIG. 8D, corresponding to the refined-symptom database 218D, it can be observed that, for the error—30082, there are two possible causes: a user identifier, or ID, being missing; or, an unsupported function being encountered. Therefore, the representative computing system in question could be modified so that a different error results from the user ID missing as compared to an unsupported function being encountered. Such a suggestion to revise the code of the computing system may come about from the performance of 308 of the method 300 of FIG. 3, for instance.

Referring back to FIG. 8C, it is noted that the table 815 also corresponds to the function database 218E. In this example, the function database 218E is identical to the no-error database 218C. This is because the function database 218E is constructed from the no-error database 218C, where the root causes of no errors of the causes of no errors of the no-error database 218C are culled into the function database 218E. However, since there is just one cause of no errors in the no-error database 218C to which the table 815 corresponds, this single cause of no errors by definition has to be a root cause of no errors, such that the function database 218E constructed from the no-error database 218C to which the table 815 is identical. As a result, the table 815 corresponds to both the no-error database 218C and the function database 218E.

Furthermore, from the table 815 of FIG. 8C, in particular correspondence to the function database 218E, it is noted that where both the password and the user ID are missing, an error is not caused. However, the representative computing system may be such that the user identifier and password are required properties. Therefore, the computing system may indeed be filling in values for both of these properties, because otherwise an error would have been caused. Analysis of the code of the computing system may result in determining that the computing system is reverting to default values for these properties, which is undesirable. Such a determination may come about from the performance of 314 of the method 300 of FIG. 3, for instance.

CONCLUSION AND OTHER EMBODIMENTS

It is noted that, although specific embodiments have been illustrated and described herein, it will be appreciated by those of ordinary skill in the art that any arrangement calculated to achieve the same purpose may be substituted for the specific embodiments shown. For example, embodiments of the invention have also been at least substantially described in relation to the errors 215 occurring due to execution of the computer code of the target system 208. However, in other embodiments, the errors 215 may be specifically those that occur due to execution of one, or more than one, component of the computer code of the target system 208, as well as due to the interaction of these components.

As another example, whereas embodiments of the invention have been described in relation to injecting faults into the data 212, such as configuration data, in other embodiments faults can instead be injected into the data 214, such as customer-supplied business data, in addition to and/or in lieu of injecting faults into the data 212. This application is thus intended to cover any adaptations or variations of embodiments of the present invention. Therefore, it is manifestly intended that this invention be limited only by the claims and equivalents thereof.

What is claimed is:
1. A method for analyzing computer code comprising:
a processor of a computer system executing the computer code over first data and second data, wherein the computer code is executable on a target system, wherein the first data configures the target system and the second data provides operational data for the computer code to generate an output, the first data being at least substantially independent of the second data to an extent that the first data and the second data does not interfere with each other in causing errors during said executing, and the first data having a plurality of elements, wherein the computer system simulates the operations of the target system for said executing;
constructing a symptom database having a plurality of entries based on the operations and the output from said executing, wherein each entry of the plurality of entries is independently selected from the group consisting of an error entry and a no-error entry, wherein the error entry comprises an error identifier that indicates an associated error that had occurred during said executing and a configuration element of the first data to which the associated error is attributable, and wherein the no-error entry comprises an improper behavior identifier that indicates an associated improper behavior that occurred during said executing and a configuration property of the first data to which the associated improper behavior is attributable;
analyzing at least one error that occurred during said executing by use of an error database based on a first subset of said plurality of entries that are error entries;
analyzing at least one no-error that occurred during said executing by use of a no-error database based on a second subset of said plurality of entries that are no-error entries;
organizing said at least one error into a set of error classes to which said at least one error is a member and organizing error-causing elements that correspond to a respective error class in the first set of error classes into a set of error-causing elements; and generating a set of redundant elements that are not members of the set of error-causing elements.

2. The method of claim 1, said analyzing at least one error comprising:

constructing the error database from the first subset of said plurality of entries;

constructing a refined-symptom database from the error database;

determining that more than one entry is present in the refined-symptom database for a unique error associated with a first error identifier; and communicating to a user a recommendation to revise the computer code such that the unique error is attributable only to a first configuration element of the first data.

3. The method of claim 2, said constructing the refined-symptom database comprising:

selecting entries comprising the first error identifier from said at least one error entry of the error database;

selecting the first configuration element of the first data, wherein the first error identifier and the first configuration element are in a same error entry of the error database;

determining a set of configuration elements of the first data to which the unique error associated with the first error identifier is attributable such that the first configuration element represents said set of configuration elements as a single cause of the unique error; and adding to the refined-symptom database a refined-symptom entry comprising the first error identifier and the first configuration element as the single cause of the unique error.

4. The method of claim 3, said organizing comprising:

determining a subset of configuration elements from all configuration elements presented in at least one refined-symptom entry;

determining a subset of unique errors that correspond to each configuration element of the subset of configuration elements according to said at least one refined-symptom entry;

defining an error class for the subset of unique errors;

associating the subset of configuration elements with the error class; and adding the subset of configuration elements to the set of error-causing elements such that the set of error-causing elements comprises at least one configuration element of the first data that singularly originates a respective error in the error class.

5. The method of claim 1, said analyzing at least one no-error comprising:

constructing the no-error database from the second subset of said plurality of entries;

constructing a function database from the no-error database;

determining that more than one entry is present in the function database for a unique improper behavior associated with a first improper behavior identifier; and communicating to a user a message notifying that the computer code results in the unique improper behavior from said executing by interacting with a first configuration property of the first data that is associated with the first improper behavior identifier.

6. The method of claim 5, said constructing the function database comprising:

selecting entries comprising the first improper behavior identifier from said at least one no-error entry of the no-error database;

selecting the first configuration property of the first data, wherein the first improper behavior identifier and the first configuration property are in a same no-error entry of the no-error database;

determining a set of configuration properties of the first data to which the unique improper behavior associated with the first improper behavior identifier is attributable such that the first configuration property represents said set of configuration properties as a single cause of the unique improper behavior; and adding to the function database a function entry comprising the first improper behavior identifier and the first configuration property as the single cause of the unique improper behavior.

7. A computer program product comprising:

a computer readable storage medium having a computer readable program code embodied therein, said computer readable program code containing instructions that perform analyzing a computer code, said analyzing the computer code comprising;

executing the computer code over first data and second data, wherein the computer code is executable on a target system, wherein the first data configures the target system and the second data provides operational data for the computer code to generate an output, the first data being at least substantially independent of the second data to an extent that the first data and the second data does not interfere with each other in causing errors during said executing, and the first data having a plurality of elements, wherein the computer system simulates the operations of the target system for said executing;

constructing a symptom database having a plurality of entries based on the operations and the output from said executing, wherein each entry of the plurality of entries is independently selected from the group consisting of an error entry and a no-error entry, wherein the error entry comprises an error identifier that indicates an associated error that had occurred during said executing and a configuration element of the first data to which the associated error is attributable, and wherein the no-error entry comprises an improper behavior identifier that indicates an associated improper behavior that occurred during said executing and a configuration property of the first data to which the associated improper behavior is attributable;

analyzing at least one error that occurred during said executing by use of an error database based on a first subset of said plurality of entries that are error entries;

analyzing at least one no-error that occurred during said executing by use of a no-error database based on a second subset of said plurality of entries that are no-error entries;

organizing said at least one error into a set of error classes to which said at least one error is a member and organizing error-causing elements that correspond to a respective error class in the first set of error classes into a set of error-causing elements; and generating a set of redundant elements that are not members of the set of error-causing elements.

8. The computer program product of claim 7, said analyzing at least one error comprising:

constructing the error database from the first subset of said plurality of entries;

constructing a refined-symptom database from the error database;

determining that more than one entry is present in the refined-symptom database for a unique error associated with a first error identifier; and communicating to a user a recommendation to revise the computer code such that the unique error is attributable only to a first configuration element of the first data.

9. The computer program product of claim 8, said constructing the refined-symptom database comprising:

selecting entries comprising the first error identifier from said at least one error entry of the error database;

selecting the first configuration element of the first data, wherein the first error identifier and the first configuration element are in a same error entry of the error database;

determining a set of configuration elements of the first data to which the unique error associated with the first error identifier is attributable such that the first configuration element represents said set of configuration elements as a single cause of the unique error; and adding to the refined-symptom database a refined-symptom entry comprising the first error identifier and the first configuration element as the single cause of the unique error.

10. The computer program product of claim 9, said organizing comprising:

determining a subset of configuration elements from all configuration elements presented in at least one refined-symptom entry;

determining a subset of unique errors that correspond to each configuration element of the subset of configuration elements according to said at least one refined-symptom entry;

defining an error class for the subset of unique errors;

associating the subset of configuration elements with the error class; and adding the subset of configuration elements to the set of error-causing elements such that the set of error-causing elements comprises at least one configuration element of the first data that singularly originates a respective error in the error class.

11. The computer program product of claim 7, said analyzing at least one no-error comprising:

constructing the no-error database from the second subset of said plurality of entries;

constructing a function database from the no-error database;

determining that more than one entry is present in the function database for a unique improper behavior associated with a first improper behavior identifier; and communicating to a user a message notifying that the computer code results in the unique improper behavior from said executing by interacting with a first configuration property of the first data that is associated with the first improper behavior identifier.

12. The computer program product of claim 11, said constructing the function database comprising:

selecting entries comprising the first improper behavior identifier from said at least one no-error entry of the no-error database;

selecting the first configuration property of the first data, wherein the first improper behavior identifier and the first configuration property are in a same no-error entry of the no-error database;

determining a set of configuration properties of the first data to which the unique improper behavior associated with the first improper behavior identifier is attributable such that the first configuration property represents said set of configuration properties as a single cause of the unique improper behavior; and adding to the function database a function entry comprising the first improper behavior identifier and the first configuration property as the single cause of the unique improper behavior.

13. A computer system comprising a processor and a computer readable memory unit coupled to the processor, said computer readable memory unit containing instructions that when run by the processor implement a method for analyzing a computer code, said method comprising:

executing the computer code over first data and second data, wherein the computer code is executable on a target system, wherein the first data configures the target system and the second data provides operational data for the computer code to generate an output, the first data being at least substantially independent of the second data to an extent that the first data and the second data does not interfere with each other in causing errors during said executing, and the first data having a plurality of elements, wherein the computer system simulates the operations of the target system for said executing;

constructing a symptom database having a plurality of entries based on the operations and the output from said executing, wherein each entry of the plurality of entries is independently selected from the group consisting of an error entry and a no-error entry, wherein the error entry comprises an error identifier that indicates an associated error that had occurred during said executing and a configuration element of the first data to which the associated error is attributable, and wherein the no-error entry comprises an improper behavior identifier that indicates an associated improper behavior that occurred during said executing and a configuration property of the first data to which the associated improper behavior is attributable;

analyzing at least one error that occurred during said executing by use of an error database based on a first subset of said plurality of entries that are error entries;

analyzing at least one no-error that occurred during said executing by use of a no-error database based on a second subset of said plurality of entries that are no-error entries;

organizing said at least one error into a set of error classes to which said at least one error is a member and organizing error-causing elements that correspond to a respective error class in the first set of error classes into a set of error-causing elements; and generating a set of redundant elements that are not members of the set of error-causing elements.

14. The computer system of claim 13, said analyzing at least one error comprising:

constructing the error database from the first subset of said plurality of entries;

constructing a refined-symptom database from the error database;

determining that more than one entry is present in the refined-symptom database for a unique error associated with a first error identifier; and communicating to a user a recommendation to revise the computer code such that the unique error is attributable only to a first configuration element of the first data.

15. The computer system of claim 14, said constructing the refined-symptom database comprising:

selecting entries comprising the first error identifier from said at least one error entry of the error database;

selecting the first configuration element of the first data, wherein the first error identifier and the first configuration element are in a same error entry of the error database;

determining a set of configuration elements of the first data to which the unique error associated with the first error identifier is attributable such that the first configuration element represents said set of configuration elements as a single cause of the unique error; and adding to the refined-symptom database a refined-symptom entry comprising the first error identifier and the first configuration element as the single cause of the unique error.

16. The computer system of claim 15, said organizing comprising:

determining a subset of configuration elements from all configuration elements presented in at least one refined-symptom entry;

determining a subset of unique errors that correspond to each configuration element of the subset of configuration elements according to said at least one refined-symptom entry;

defining an error class for the subset of unique errors;

associating the subset of configuration elements with the error class; and adding the subset of configuration elements to the set of error-causing elements such that the set of error-causing elements comprises at least one configuration element of the first data that singularly originates a respective error in the error class.

17. The computer system of claim 13, said analyzing at least one no-error comprising:

constructing the no-error database from the second subset of said plurality of entries;

constructing a function database from the no-error database;

determining that more than one entry is present in the function database for a unique improper behavior associated with a first improper behavior identifier; and communicating to a user a message notifying that the computer code results in the unique improper behavior from said executing by interacting with a first configuration property of the first data that is associated with the first improper behavior identifier.

18. The computer system of claim 17, said constructing the function database comprising:

selecting entries comprising the first improper behavior identifier from said at least one no-error entry of the no-error database;

selecting the first configuration property of the first data, wherein the first improper behavior identifier and the first configuration property are in a same no-error entry of the no-error database;

determining a set of configuration properties of the first data to which the unique improper behavior associated with the first improper behavior identifier is attributable such that the first configuration property represents said set of configuration properties as a single cause of the unique improper behavior; and adding to the function database a function entry comprising the first improper behavior identifier and the first configuration property as the single cause of the unique improper behavior.

* * * * *